United States Patent [19]
Hajec

[11] Patent Number: 5,323,076
[45] Date of Patent: Jun. 21, 1994

[54] DISK SPINDLE MOTOR

[76] Inventor: Chester S. Hajec, 6850 Glen Rd., Woodbury, Minn. 55125

[21] Appl. No.: 8,885

[22] Filed: Jan. 22, 1993

Related U.S. Application Data

[63] Continuation-in-part of Ser. No. 825,619, Jan. 24, 1992, abandoned.

[51] Int. Cl.⁵ .......................... H02K 7/08; H02K 7/14; F16C 33/74
[52] U.S. Cl. ................... 310/90; 310/67 R; 384/133
[58] Field of Search ........ 310/67 R, 90, 152; 384/133, 446; 360/98.07, 99.04, 99.08

[56] References Cited

U.S. PATENT DOCUMENTS

| | | | |
|---|---|---|---|
| 3,232,680 | 2/1966 | Clark | 384/110 |
| 4,043,612 | 8/1977 | Orcutt | 384/110 |
| 4,254,961 | 3/1981 | Fersht et al. | 310/905 |
| 4,673,997 | 6/1987 | Gowda et al. | 360/107 |
| 4,694,213 | 9/1987 | Gowda et al. | 310/90 |
| 4,734,606 | 3/1988 | Hajec | 310/90.5 |
| 4,824,122 | 4/1989 | Raj et al. | 277/80 |
| 5,038,062 | 8/1991 | Shiraki | 310/36 |
| 5,124,604 | 6/1992 | Swartz | 310/268 |
| 5,134,331 | 7/1992 | Miyaji et al. | 310/90 |

Primary Examiner—Steven L. Stephan
Assistant Examiner—C. La Balle

[57] ABSTRACT

A disk spindle motor having a permanent magnet central shaft. A pair of annular, non-magnetic combination thrust and journal bearings having truncated-conical outer surfaces are spaced apart on the shaft. The bearings coact with complementary surfaces of the hub of a motor rotor. Shaft end caps connect the shaft to base means and have radially extending shoulders which define annular gaps with the rotor and function as ferrofluidic seals.

10 Claims, 12 Drawing Sheets

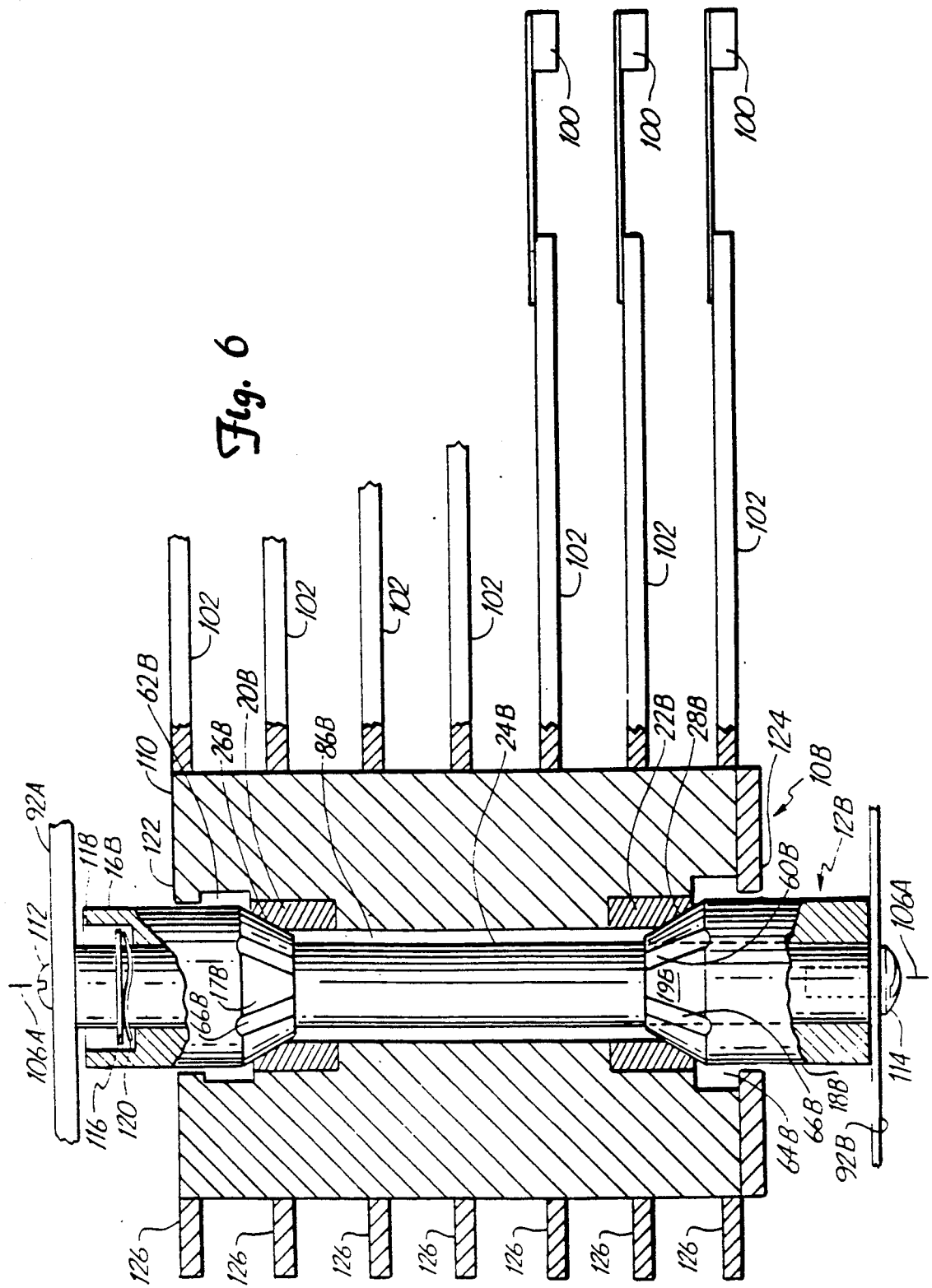

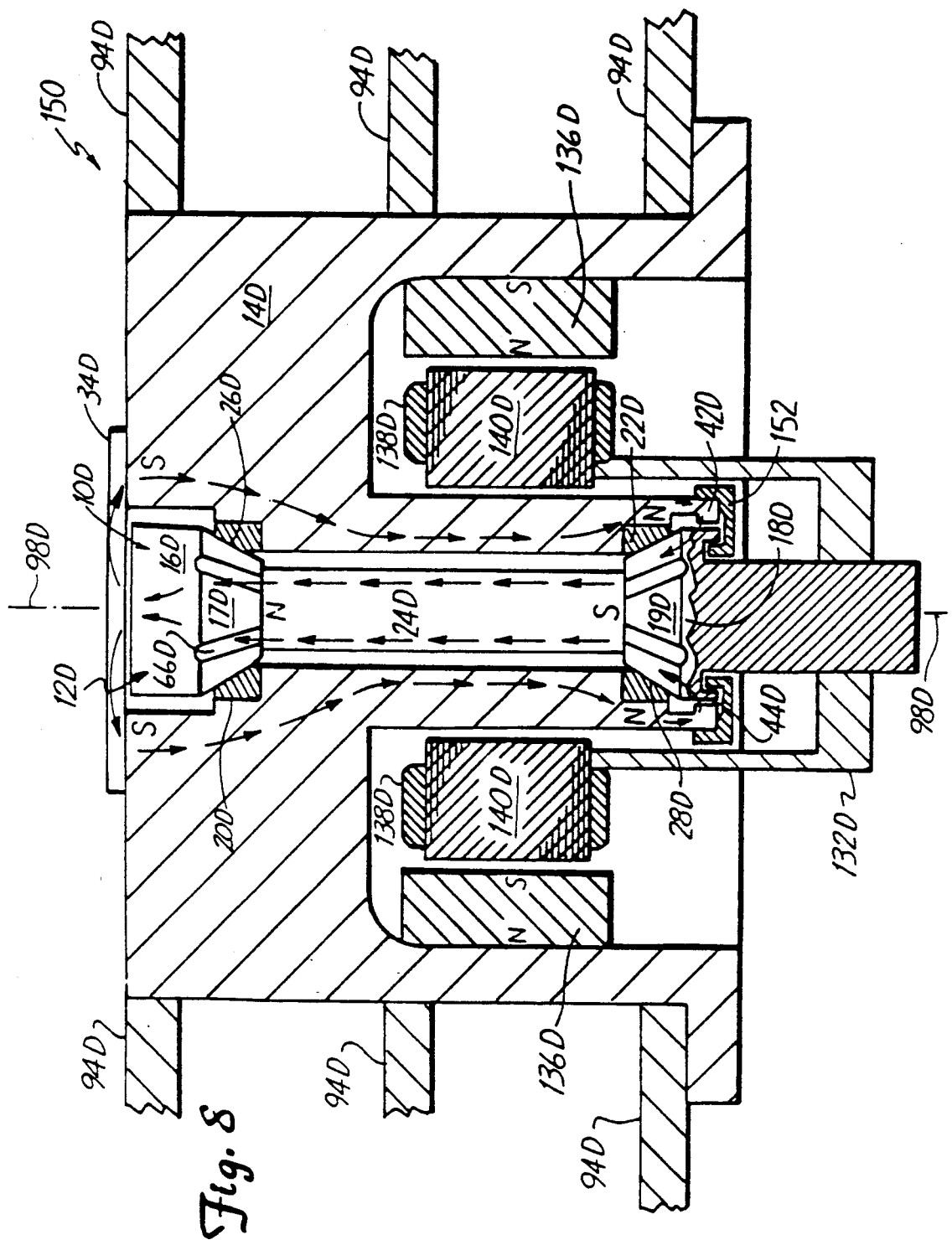

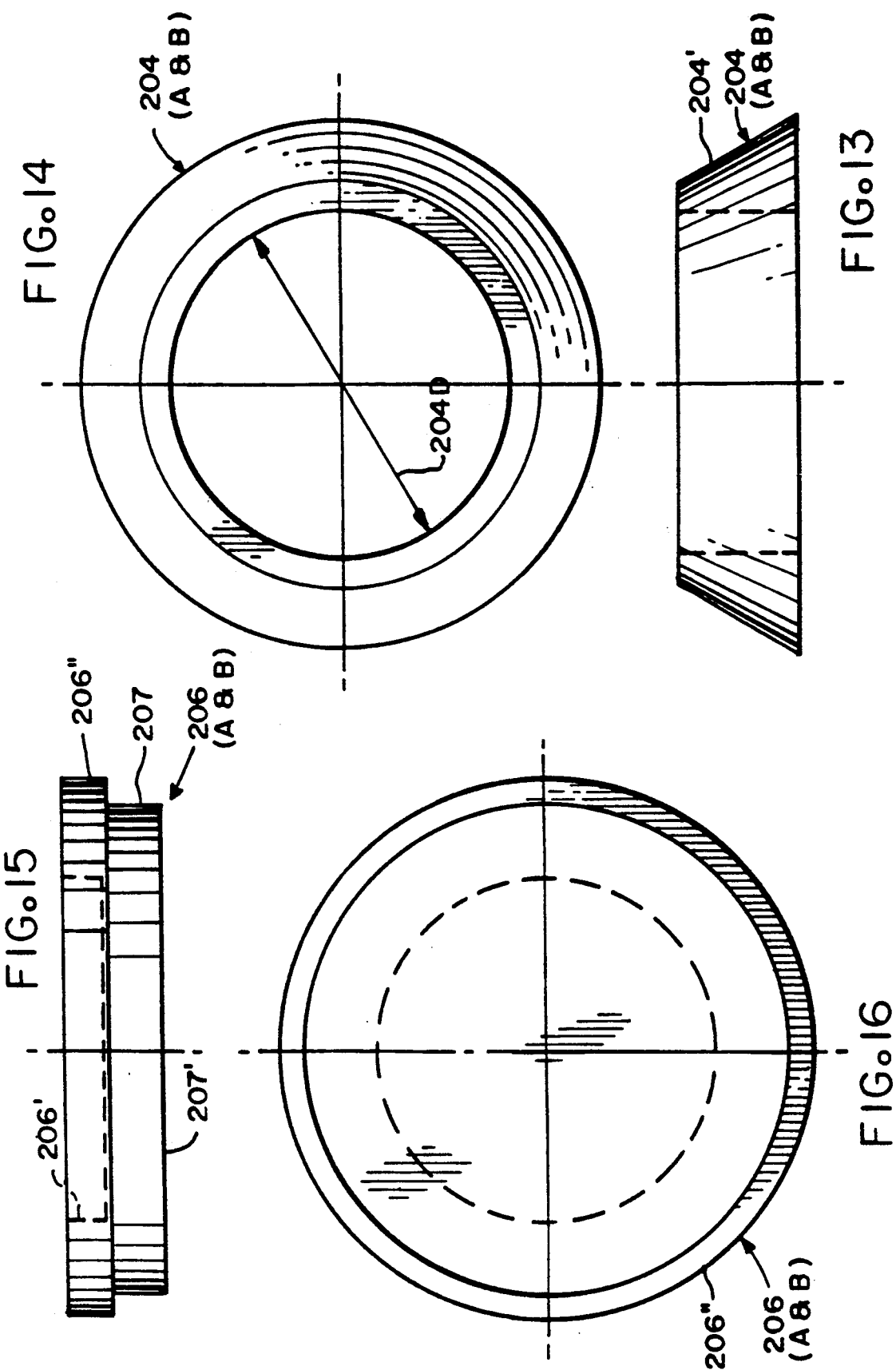

DISK SPINDLE MOTOR

This is a continuation-in-part of copending application(s) Ser. No. 07/825,619 filed on Jan. 24, 1992, now abandoned.

BACKGROUND OF THE INVENTION

The present invention relates to bearing cartridges, and in particular to bearing cartridges having a ferrofluid lubricant.

The use of ferrofluid bearings as an alternative to ball bearings is disclosed in U.S. Pat. No. 4,734,606 by the inventor of the present invention and incorporated herein by reference. Ferrofluid bearings have provided particular advantages over ball bearings when used in magnetic disk storage systems. More specifically, ferrofluid bearings tend to produce less audible noise than ball bearings. Furthermore, the use of ferrofluid bearings instead of ball bearings eliminates vibration produced by the inner ball bearing race, the outer ball bearing race and the ball bearings.

The use of a ferrofluid bearing in a disk spindle motor improves several performance factors of a magnetic disk storage device. Ferrofluid bearings tend to reduce or attenuate vibration originating in other parts of the disk storage device. In addition, ferrofluid bearings tend to have lower electrical resistance between the outer race and the inner race than ball bearings thereby providing a better discharge path to more rapidly dissipate any electrostatic charge that builds up on the disk surface. Furthermore, ferrofluid bearings tend to have a larger surface area between the bearing races over which to distribute shock loads, thereby withstanding mechanical shock better.

The ever increasing demands for greater memory capacity, lower production costs, faster memory access times, decreased size and weight of disk storage devices has placed increasing demands on the performance of the disk spindle motor. There is an increasing need for the bearing cartridges used in disk storage devices to provide improved performance factors such as reduced drag characteristics, improved ferrofluid containment and reduced manufacturing costs.

SUMMARY OF THE INVENTION

The present invention is a bearing cartridge that includes a shaft defining both an axis and a first bearing race. The bearing cartridge includes a hub that is capable of axial rotation relative to the shaft. The hub defines a second bearing race that is coaxially aligned with the first bearing race. One of the shaft and the hub being magnetized to provide a magnetic field. A ferrofluid is included as well as a flux channeling means for channeling magnetic flux provided by the magnetic field. The magnetic flux is channeled between a gap defined by the shaft and the hub so that a the ferrofluid is maintained therein.

In preferred embodiments a sleeve is attached to one of the shaft and the hub. The magnetic flux path which extends between the shaft and the hub bypasses the sleeve.

In preferred embodiments, the inner race and the outer race have tapered surfaces which are generally parallel to one another. As a result, relative axial movement of the sleeve with respect to the shaft provides adjustment of the gap between the inner and outer races. The invention preferably includes means for varying the relative axial position of the shaft and the sleeve to vary the performance of the bearing formed by the inner and outer races and the ferrofluid lubricant.

BRIEF DESCRIPTION OF THE DRAWINGS

FIG. 6 is a side plan view of an actuator arm supported by the bearing cartridge shown in FIGS. 3 and 4.

FIG. 8 is a side elevational view shown in partial section of another embodiment of the disk spindle motor shown in FIG. 5.

FIGS. 13 and 14 are side elevational and top views, respectively, of an annularly shaped non-magnetic combination thrust and journal bearing member with the outer portion thereof shaped to provide truncated-conical bearing surface for use in the FIG. 10 motor.

FIG. 15 is a side elevational view of a magnetically permeable end cap for use in the FIG. 10 motor and FIG. 16 is an end-view of the end cap.

DETAILED DESCRIPTION OF THE PREFERRED EMBODIMENTS

Figure 1:
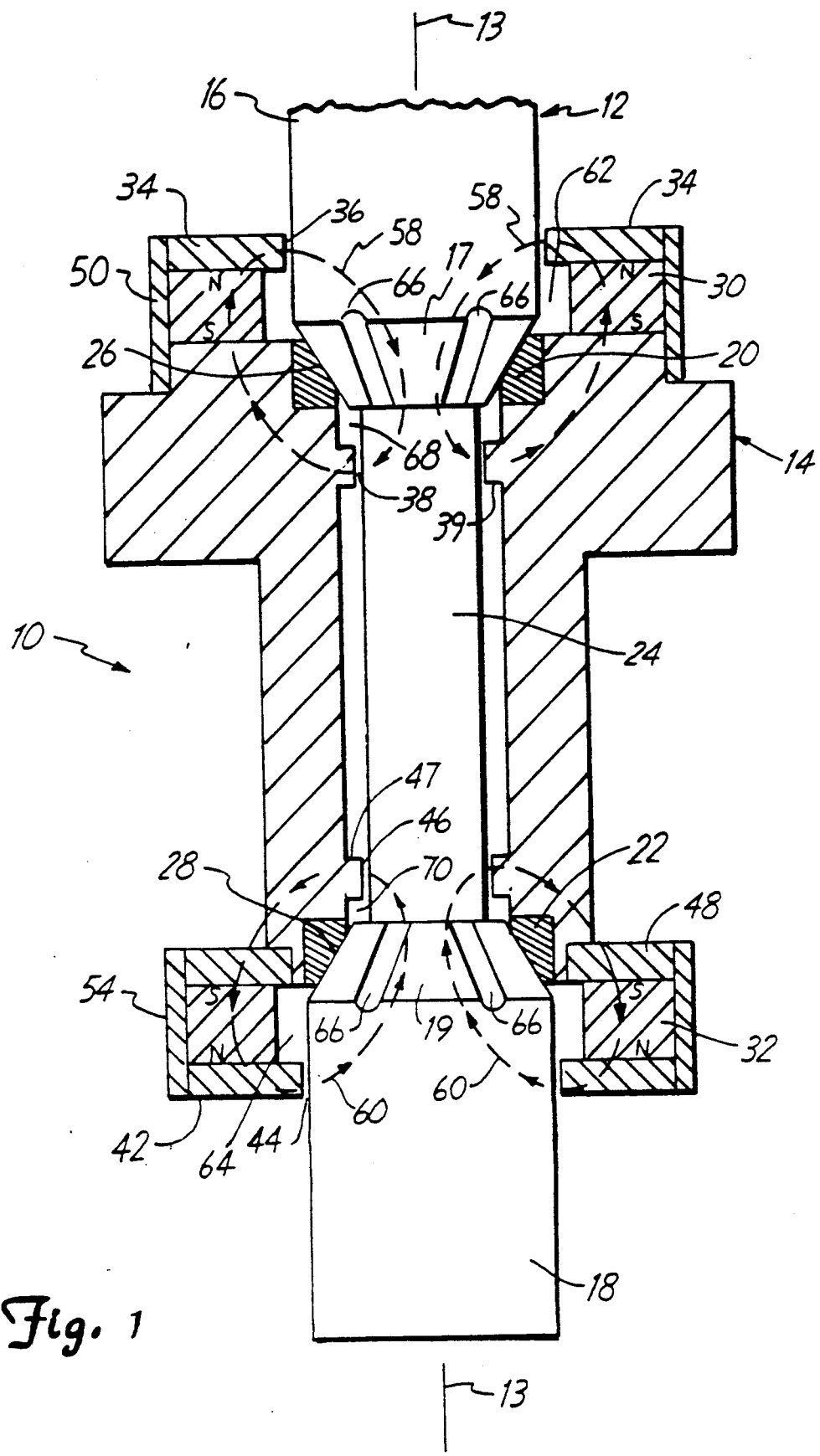
FIG. 1 is a side elevational view of a first embodiment of the bearing cartridge of the present invention with the hub portion shown in section.
Figure 2:
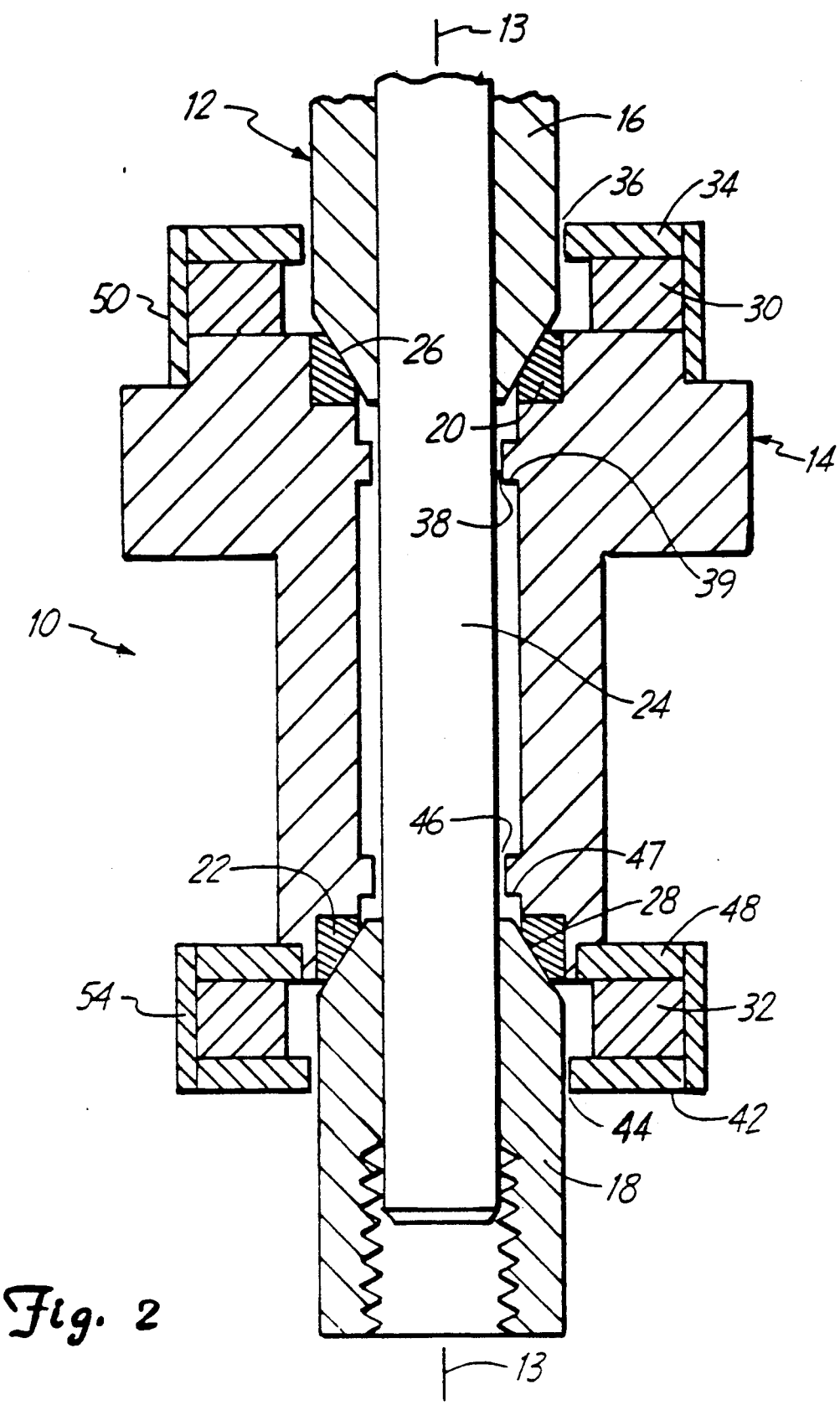
FIG. 2 is a side elevational view of the bearing cartridge shown in FIG. 1 with the hub and inner bearing races shown in section.

As shown in FIGS. 1 and 2, bearing cartridge includes an inner shaft portion 12 and an outer hub portion 14. A ferrofluid bearing is formed by the inner shaft portion 12, the outer surface of which forms an inner bearing race, and the outer hub portion 14, the inner surface of which forms an inner bearing race. The inner bearing race is coaxially aligned with the outer bearing race. The outer hub portion 14 is capable of rotating relative to inner shaft portion 12 about an axis of rotation 13 defined by the inner shaft portion 12.

Inner shaft portion 12 is preferably formed of three pieces, an upper shaft section 16, a lower shaft section 18, and a central shaft section 24. The upper shaft section 16 and lower shaft section 18 are cylindrical sleeves that are preferably pressed onto central shaft section 24. The upper shaft section 16 has a tapered surface 17 that tapers so that it is narrower at its lower end. The lower shaft section 18 has a tapered surface 19 that tapers in an opposite direction and is narrower at its upper end.

The outer hub portion 14 has an upper sleeve 20 and a lower sleeve 22. The upper sleeve 20 has an inner surface that has an internal taper which matches the taper of tapered surface 17 on upper shaft 16. The lower sleeve 22 has an inner surface that has an internal taper which matches the taper of tapered surface 19 on lower shaft section 18. Both the upper sleeve 20 and the lower sleeve 22 are either press-fit, glued or attached to outer hub portion 14 in some conventional manner so as to be held permanently in place. Tapered surfaces 17 and 19 have an angle of taper defined as the angle between the axis of rotation 13 and a line parallel to the tapered surfaces 17 and 19, respectively. This taper angle is dependent upon performance characteristics of the bearing.

Positioned in an upper gap 26 between tapered surface 17 and the inner tapered surface of upper sleeve 20 is a ferrofluid lubricant. The ferrofluid lubricant from upper gap 26 is contained by magnetic flux produced by upper permanent magnet means 30 and lower permanent magnet means 32, respectively. Magnetic flux provided by upper permanent magnet means 30 flows through upper flux channeling means 34 that channels flux across first upper gap 36 and through inner shaft portion 12, and then back across a second upper gap 38, through an inner flux channeling means 39, through hub portion 14 and back to upper permanent magnet means 30. The upper flux channeling means 34, upper shaft section 16, central shaft section 24 and hub portion 14 are a magnetically permeable material such as magnetic stainless steel so as to provide a good flux path.

In a similar manner, the ferrofluid lubricant from lower gap 28 is contained by magnetic flux produced by lower permanent magnet means 32. Magnetic flux flows from lower permanent magnet means 32 through a lower flux channeling means 42, across first lower gap 44 to lower shaft section 18, through central shaft section 24, and then back across second lower gap 46, through an inner flux channeling means 47, through hub portion 14, through an inner pole piece 48, and back to lower permanent magnet means 32. The lower flux channeling means 42, lower shaft section 18, central shaft section 24, hub portion 14, and an inner pole piece 48 are a magnetically permeable material such as magnetic stainless steel, so that they provide a good flux path.

In one preferred embodiment, upper permanent magnet means 30 is toroidally shaped and coaxially mounted over inner shaft portion 12. Upper permanent magnet means 30 is attached with an adhesive or glue to the upper portion of hub 14. Upper flux channeling means 34 is preferably a magnetic washer that is positioned coaxially over upper shaft section 16 and glued or bonded with an adhesive to the outer portion of upper permanent magnetic means 30. The first upper gap 36 is defined by the outer surface of upper shaft section 16 and the inner surface of upper flux channeling means 34. A cylindrical upper sleeve 50 encloses the upper hub portion 14, upper permanent magnet means 30, and upper flux channeling means 34. The upper sleeve 50 is glued or adhesively bonded to the hub portion 14, permanent magnet means 30 and upper flux channeling means 34 thereby holding each of these elements in place.

The inner flux channeling means 39 is formed by a flanged portion on the inner diameter of hub portion 14.

The second upper gap 38 is defined by the inner surface of flux channeling means 39 and the outer surface of central shaft portion 24.

In one preferred embodiment, the inner pole piece 48 is a magnetic washer that is glued or adhesively attached to the lower end of hub portion 14. Permanent magnet means 32 is a toroidally shaped permanent magnet that is positioned coaxially over lower shaft section 18 and glued or adhesively bonded to inner pole piece 48. The lower flux channeling means 42 is a magnetically permeable washer that is coaxially positioned over lower shaft section 18 and glued or adhesively attached to the lower permanent magnet means 32. The first lower gap 44 is defined by the space between the inside diameter of lower flux channeling means 42 and the outside diameter of lower shaft section 18. Lower sleeve 54 is a cylindrical sleeve that is coaxially mounted over and adhesively bonded to each of the inner pole piece 48, the lower permanent magnet means 32 and the lower flux channeling means 42. An inner flux channeling means 47 is formed by a flanged portion on the inner diameter of hub portion 14. The spacing between the inner flux channeling means 47 and the central shaft section 24 defines the second lower gap 46.

As seen in FIG. the magnetic flux produced by upper permanent magnet means 30 forms an upper flux path that can be represented by arrows identified by reference numeral 58. As can be seen, these magnetic flux lines pass through the inner portion of upper sleeve 20 and return back around the outer portion of the sleeve 20. Sleeve 20 is preferably made from a non-magnetic material such as brass or nonmagnetic steel thereby having high reluctance, for preventing the magnetic flux from passing between upper shaft section 16 and upper sleeve 20. Both the outer flux channeling means 34 and the inner flux channeling means 39 provide a lower reluctance path between the hub portion 14 and the inner shaft portion 12 than does upper sleeve 20. Therefore, most of the magnetic flux tends to pass through both the outer flux channeling means 34 and the inner flux channeling means 39 providing a concentration of magnetic flux. This concentration of magnetic flux at these low reluctance paths between inner shaft portion 12 and outer hub portion 14 tends to retain ferrofluid lubricant therein, and thereby form ferrofluidic seals.

The magnetic flux produced by lower permanent magnet 32 forms a lower flux path that can be represented by arrows identified by the reference numeral 60. These magnetic flux lines pass through the inner portion of lower sleeve 22 and return back around the outer portion of the sleeve 22. The lower sleeve 22 is preferably made from a material having relatively high reluctance for preventing the magnetic flux from passing between lower shaft section 18 and the lower sleeve 22. Both the inner flux channeling means 47 and the lower flux channeling means 42 provide a lower reluctance path between the hub portion 14 and the inner shaft portion 12 than does lower sleeve 22. Therefore, most of the magnetic flux tends to pass through both the lower flux channeling means 42 and the inner flux channeling means 47, providing a concentration of magnetic flux. This concentration of magnetic flux at these low reluctance paths between inner shaft portion 12 and the outer hub portion 14 tends to retain ferrofluid lubricant therein and thereby form ferrofluidic seals.

The rotation of outer hub portion 14 relative to inner shaft portion 12 results in ferrofluid lubricant nearest the outer hub 14 tending to move with the outer hub, while the ferrofluid lubricant nearest the inner shaft portion 12 tends to remain stationary with the inner shaft portion 12, thereby producing a velocity gradient in the ferrofluid lubricant. The angular acceleration of ferrofluid lubricant nearest the outer hub results in a centrifugal force acting on this ferrofluid lubricant. This centrifugal force tends to cause the ferrofluid lubricant located in upper gap 26 to move in an upward and outward direction along the tapered surface of upper sleeve 20. In a similar manner, the centrifugal force acting on ferrofluid lubricant position in lower gap 28 tends to move in a downward and outward direction along the tapered surface of lower sleeve 22. An upper reservoir 62 collects ferrofluid lubricant that is forced from upper gap 26, and a lower reservoir 64 collects ferrofluid lubricant forced from lower gap 28. The ferrofluidic seals tend to contain the ferrofluid lubricant thus preventing ferrofluid lubricant in upper reservoir 62 from escaping through first upper gap 36, and ferrofluid lubricant in lower reservoir 64 from escaping through the first lower gap 44.

The tapered surfaces 17 and 19 have a plurality of grooves 66 therein. These grooves 66 or depressions in the tapered surface extend the entire length of the taper and thereby allow each of the outer reservoirs 62 and 64 to communicate with a pair of inner reservoirs 68 and 70, respectively. As outer hub 14 rotates relative to inner shaft portion 12, ferrofluid lubricant located in upper gap 26 and lower gap 28 is forced into outer reservoirs 62 and 64, respectively, thereby producing a fluid pressure. The fluid pressure in both outer reservoirs 62 and 64 tends to cause ferrofluid lubricant to move from outer reservoirs 62 and 64 along grooves 66 towards inner reservoirs 68 and 70, respectively. Because the ferrofluid lubricant positioned within grooves 66 near the surface of inner shaft portion 12 tends to remain stationary with the shaft 12, there is little or no angular acceleration of this fluid and therefore little or no centrifugal force resisting this return flow of ferrofluid lubricant toward the inner reservoirs 68 and 70. In this manner, the rotating tapered surface of outer sleeves 20 and 22 act as centrifugal pumps causing ferrofluid lubricant to move from inner reservoirs 68 and 70 towards outer reservoirs 62 and 64, and return via the oil return paths or grooves 66.

The use of a non-magnetic upper sleeve 20 and lower sleeve 22 allows the magnetic flux paths 58 and 60 to enclose or surround the upper and lower sleeves 20 and 22 without passing through these sleeves. This arrangement provides containment of the ferrofluid lubricant to a relatively small area on either side of the upper and lower gaps 26 and 28. By confining the ferrofluid lubricant to the bearing surface area, the amount of ferrofluid lubricant required can be reduced, because the ferrofluid lubricant is restricted to the bearing surface area and the area immediately surrounding the bearing surface. Reducing the amount of ferrofluid lubricant reduces the weight of the bearing cartridge.

In addition, the ferrofluid containment of the present invention prevents the migration of all the ferrofluid to one end of the bearing cartridge, thus causing one bearing surface to become dry when inactive over extended periods of time. Furthermore, compartmentalizing the ferrofluid lubricant reduces the tendency of magnetic elements to build up sediment during prolonged periods of non-use.

Finally, the use of a non-magnetic upper sleeve 20 and lower sleeve 22 tends to prevent magnetic flux from passing between the sleeve portions 20 and 22 and the inner shaft portion 12. Because both the upper gap 26 and lower gap 28 are very small, the reluctance would be very low and therefore the magnetic flux concentration would be very high if the non-magnetic sleeves 20 and 22 were not used. High flux concentrations between the inner shaft 12 and the outer hub 14 tends to produce magnetic drag on the bearing cartridge. The use of non-magnetic sleeves 20 and 22 tends to prevent flux from passing between the inner shaft 12 and the outer hub 14. Instead, the flux path passes through gaps 36, 38, 46 and 44, which are large enough to prevent any high flux concentrations that can result in excessive magnetic drag.

As previously described, upper shaft section 16, central shaft section 24 and lower shaft section 18 are pressed together or fixed in position relative to each other. As an alternative, upper shaft section 16 and lower shaft section 18 may each be movable relative to the other, and a bias means is used to hold upper shaft section 16, central shaft section 24 and lower shaft section 18 together. The preload or biasing means (not shown) is provided to prevent the upper shaft section 16 from moving axially upward. Similarly, the bias means prevents the lower shaft section 18 from moving axially downward. The bias means provides a preload force to axially position upper shaft section 16 and lower shaft section 18 relative to the hub portion 14 so that the separations between upper gap 26 and lower gap 28 can be adjusted. The adjustment of the separation between gaps 26 and 28 allows for the adjustment of bearing performance characteristics such as drag and runout.

Figure 3:
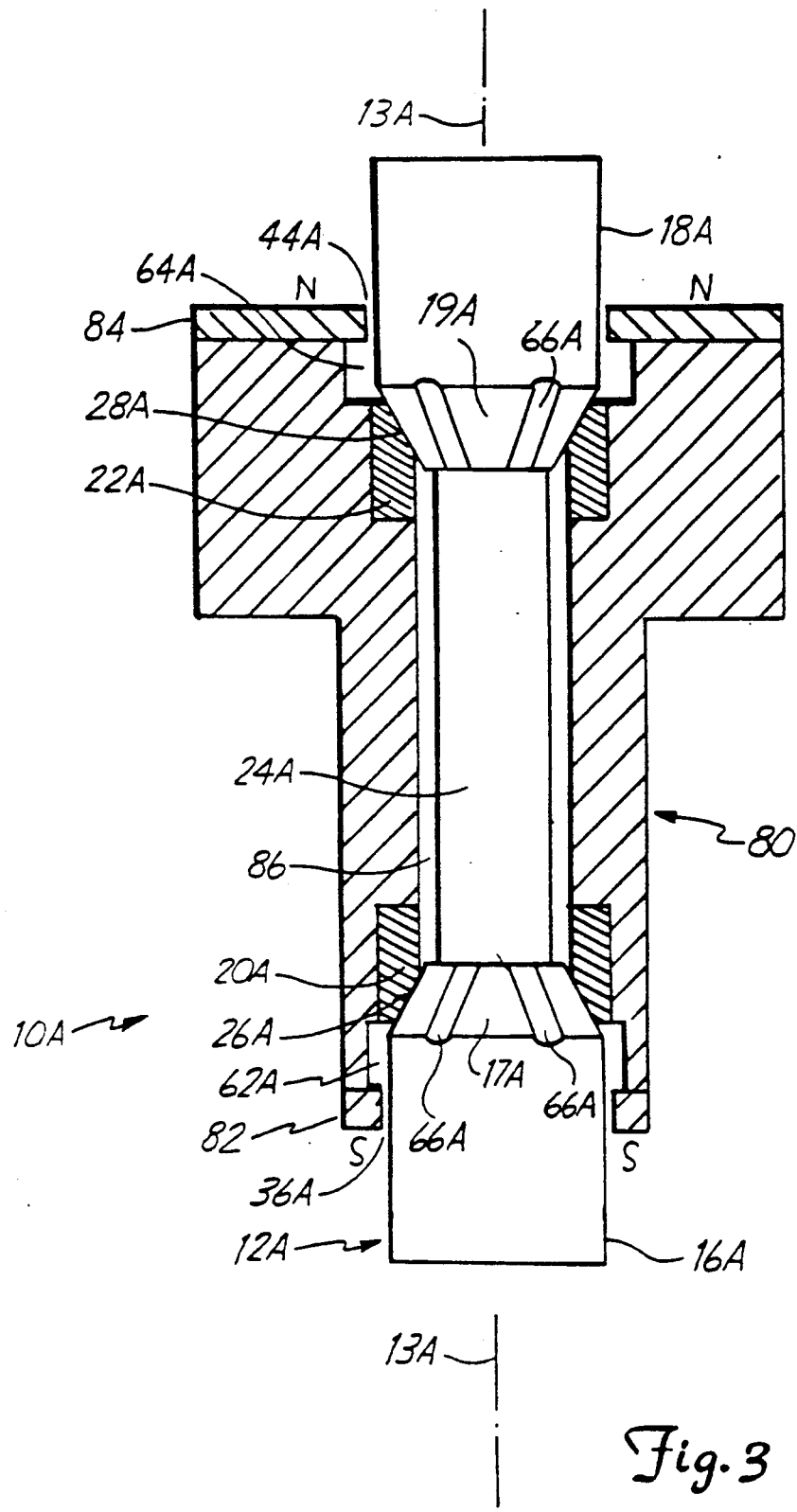
FIG. 3 is a side elevational view of another embodiment of the bearing cartridge of the present invention with the hub shown in section.
Figure 4:
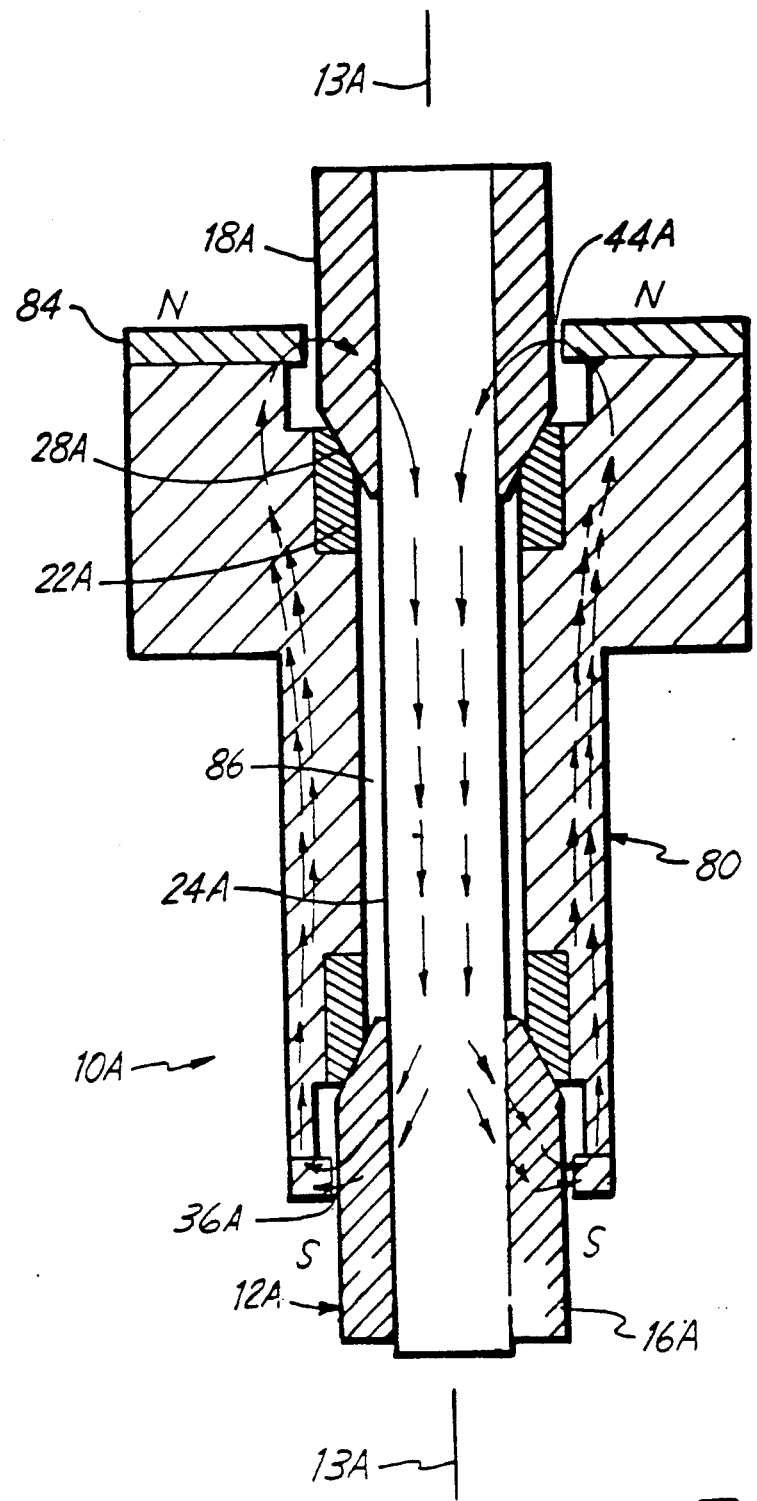
FIG. 4 is a side elevational view of the bearing cartridge shown in FIG. 3 with the hub and inner bearing races shown in section.

Another embodiment of the present invention, bearing cartridge 10A, is illustrated in FIGS. 3 and 4. Similar element identification numbers are used in these figures, as well as throughout this description, to designate similar elements. As in the previous embodiment shown in FIGS. 1 and 2, bearing cartridge 10A includes an identical inner shaft portion 12A having a central shaft section 24A with an upper shaft section 16A and a lower shaft section 18A positioned at opposite ends thereof. The upper shaft section 16A has a tapered surface 17A, the surface having grooves 66A for providing a return path for ferrofluid lubricant. Similarly, the lower shaft section 18A has tapered surface 19A, the tapered surface 19A having a series of grooves 66A for providing a return path for ferrofluid lubricant.

Bearing cartridge 10A further includes an outer hub portion 80 that is capable of rotating relative to inner shaft portion 12A about an axis of rotation 13A defined by the inner shaft portion 12A. An upper sleeve 20A is positioned on the upper inside portion of outer hub portion 80. Similarly, lower sleeve 22A is positioned on the lower inside portion of outer hub portion 80. Both the upper sleeve 20A and the lower sleeve 22A are either press-fit, glued or adhesively bonded to the outer hub portion 80. The inside surface of upper sleeve 20A has an internal taper which matches the taper of tapered surface 17A of upper shaft section 16A. Lower sleeve 22A has an inner surface that has an internal taper 22A which matches the taper of the tapered surface 19A on lower shaft section 18A. Tapered surface 17A and the tapered inner surface of upper sleeve 20A define an upper gap 26A that contains a ferrofluid lubricant. Tapered surface 19A and the complementarily tapered inner surface of lower sleeve 22A define a lower gap 28A which contains a ferrofluid lubricant.

The outer hub portion 80 is made from a high carbon steel, such as Core 10 and magnetized such that the north-south magnetic orientation is aligned with the axis of rotation. The magnetized outer hub portion 80 provides magnetic flux for holding ferrofluid lubricant in the bearing cartridge 10A. An upper flux channeling means 82 is attached to the upper end of outer hub portion 80 and a lower flux channeling means 84 is attached to the lower portion of outer hub portion 80. Both the upper flux channeling means 82 and lower flux channeling means 84 provide a low reluctance path to inner shaft portion 12 thereby forming a concentration of magnetic flux lines. Upper flux channeling means 82 and lower flux channeling means 84 are preferably magnetically permeable washers that are mounted coaxially over inner shaft portion 12A to hub portion 80. Upper flux channeling means 82 and lower flux channeling means 84 may be glued or adhesively bonded to outer hub portion 80. In another preferred embodiment, both the upper flux channeling means 82 and the lower flux channeling means 84 are formed from outer hub portion 80.

An upper gap 36A is defined by the outer surface of upper shaft section 16A and the inner surface of upper flux channeling means 82. A lower gap 44A is defined by the outer surface of lower shaft portion 18A and the inner surface of lower flux channeling means 84. The magnetic flux concentration across both upper gap 36A and lower 44A maintains ferrofluid lubricant within the gap, thereby forming a ferrofluidic seal. These ferrofluidic seals at upper gap 36A and lower gap 44A tend to contain the ferrofluid lubricant within bearing cartridge 10A in addition to preventing any particles within the bearing cartridge from escaping to contaminate the environment surrounding the bearing cartridge.

As illustrated in FIG. 4, the arrows represent magnetic flux produced by the magnetized hub portion 80. This magnetic flux flows from the magnetized hub portion 80 through the lower flux channeling means 84, across lower gap 44A to lower shaft section 18A, through inner shaft section 12A, and then back across upper gap 36A, through upper flux channeling means 82 and back to magnetized hub portion 80. The upper sleeve 26A and the lower sleeve 28A are made from a non-magnetic material such as bronze to provide a high reluctance path from each of the sleeve portions to the inner shaft portion 12, thereby preventing the magnetic flux lines from becoming short circuited. The use of a non-magnetic upper sleeve 20A and a non-magnetic lower sleeve 22A provides a higher reluctance path for magnetic flux than that of either the upper flux channeling means 82 or the lower flux channeling means 84, thereby directing the magnetic flux through the upper gap 36A and lower gap 44A forming ferrofluidic seals.

The operation of the bearing cartridge shown in FIGS. 3 and 4 is similar to that of bearing cartridge 10 shown in FIGS. 1 and 2. The rotation of outer hub portion 80 relative to inner shaft portion 12A tends to force the ferrofluid lubricant from the upper gap 26A and the lower gap 28A to an upper reservoir 62A and a lower reservoir 64A, respectively. Because the upper and lower ferrofluidic seals prevent ferrofluid lubricant from escaping from upper gap 36A and lower 44A, ferrofluid lubricant tends to move through grooves 66A to prevent a fluid pressure buildup in reservoirs 62A and 64A. The centrifugal pump formed by the rotation of the outer hub 80 relative to the inner shaft portion 12A forces ferrofluid lubricant into upper reservoir 62A and lower reservoir 64A which in turn displaces ferrofluid lubricant through grooves 66A into a central reservoir 86. Ferrofluid lubricant in the central reservoir 86 is free to migrate between upper and lower bearing portions.

A preload or biasing means (not shown) is provided to upper shaft section 16A and lower shaft section 18A. The biasing means provides a preload force to axially position the upper shaft section 16A and lower shaft section 18A relative to the hub portion 80 so that the separations between upper gap 26A and the lower gap 28A can be adjusted. The preload force is applied to minimize both upper gap 26A and lower gap 28A so that greater radial tolerances can be achieved.

Figure 5:
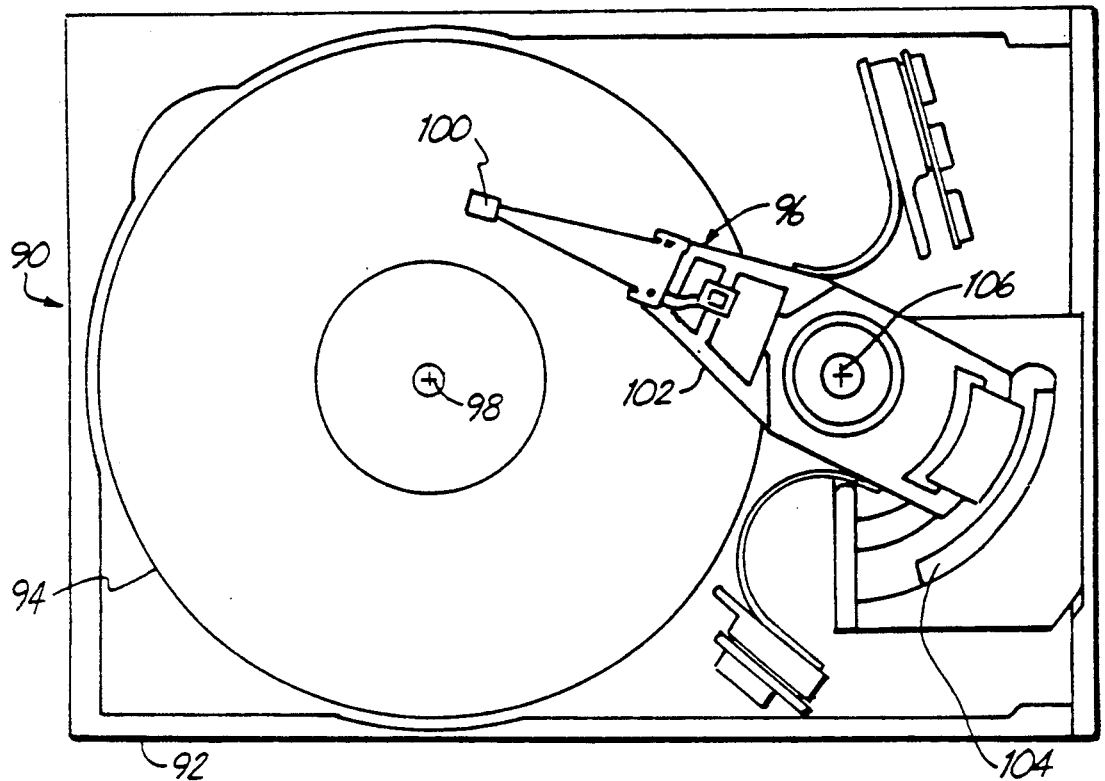
FIG. 5 is a top plan view of a disk storage system that includes the bearing cartridge of the present invention.

FIG. 5 illustrates a disk storage system 90 that incorporates the bearing cartridge of the present invention. Disk storage system 90 includes a chassis 92 that provides a clean environment for the magnetic storage media 94 and the head/actuator assembly 96. The disk storage system 90 provides data storage and retrieval on the rotating magnetic storage media 94. The magnetic storage media 94 is rotated about a spindle axis 98 by an electric disk spindle motor (not shown).

The head actuator assembly 96 includes a magnetic head 100 that is supported over the magnetic storage media 94 by actuator arm 102 and an actuator motor 104 for positioning the magnetic head to specific locations or tracks on the magnetic storage media 94. The actuator motor 104 is preferably a linear motor that is capable of pivoting the head actuator assembly 96 about a pivot axis 106 for positioning the magnetic head 100 to the desired track on magnetic storage media 94.

Frequently, the magnetic storage media 94 includes a plurality of magnetic disks that are spaced apart from each other and arranged in a vertical stack, sometimes referred to as a "disk stack." Each of the magnetic disks that form the disk stack rotate in unison about the spindle axis 98. The head actuator assembly 96 that is used in conjunction with such a disk stack has a vertically stacked arrangement with each head actuator assembly spaced apart from each other and rotating in unison about pivot axis 106. In this manner, a plurality of magnetic heads are each positioned at different magnetic disks so that a series of locations or tracks are accessed simultaneously for each magnetic disk in the disk stack.

In the disk storage system 90, the magnetic head typically is positioned or flies tenths of microns from the surface of the magnetic storage media 94. Because the magnetic head 100 flies so close to the disk surface, the air entering the chassis 92 must be filtered to prevent any contaminants, such as dust, from entering the chassis 92. Contaminants which enter chassis 92, if located on the magnetic storage media 94, may disrupt the magnetic head 100 and eventually a head "crash" or gradual damaging of the disk surface may occur.

FIG. 6 illustrates the bearing cartridge 10B of the present invention in which actuator arms 102 have been integrated to form head/actuator assembly 96. Bearing cartridge 10B is exactly the same as bearing cartridge 10A except that outer hub portion 110 is modified for mounting actuator arms 102.

Bearing cartridge 10B includes inner shaft portion 12B having an upper shaft section 16B and a lower shaft section 18B that are pressed onto a central shaft section 24B. The inner shaft portion 12B has a central axis that defines the pivot axis 106A for the head/actuator assembly 96, as shown in FIG. 5. The inner shaft portion 12B is secured within chassis 92 by an upper screw 112 which extends through a bore in a top portion 92A of chassis 92 and extends into a threaded bore that is centrally located at the upper end of central shaft section 24B. A lower screw 114 extends through a bore in the bottom portion 92B of chassis 92 and extends into a threaded bore that is centrally located at the lower end of central shaft section 24B. In this manner, inner shaft portion 12B is held securely in place within chassis 92.

A tapered surface 17B on upper shaft section 16B engages a complementary taper on the inside surface of upper sleeve 20B of outer hub portion 110. Similarly, tapered surface 19B of lower shaft section 18B engages a complementarily shaped inner taper of lower sleeve 22B of hub portion 110. A ferrofluid lubricant is positioned between these opposing tapered surfaces. The amount of ferrofluid lubricant or thickness of the lubricant within the upper gap 26B and the lower gap 28B is determined by a biasing force that is applied to upper shaft portion 16B.

The biasing force is applied with a lock ring 116 that is inserted into a countersunk bore 118 that is centrally located at the upper end of upper shaft section 16B. The lock ring 116 engages a slot (not shown) on the upper portion of central shaft portion 24B. Positioned coaxially over central shaft 24B and between lock washer 116 and upper shaft section 16B is a spring washer 120. The spring washer 120 applies a biasing force to upper shaft section 16B thereby limiting the amount of ferrofluid lubricant within upper gap 26B and lower gap 28B.

The outer hub portion 110 is made from a high carbon steel, such as Core 10, and magnetized such that the north-south magnetic orientation is aligned with the axis of rotation 106A. The magnetized outer hub portion 110 provides magnetic flux to an upper flux channeling means 122 and a lower flux channeling means 124 that form ferrofluidic seals which contain the ferrofluid lubricant within the bearing cartridge. As outer hub portion 110 rotates relative to inner shaft portion 12B, ferrofluid lubricant is centrifugally pumped from the upper gap 26B and the lower gap 28B into outer reservoirs 62B and 64B, respectively, and then back through ferrofluid return grooves 66B back to central reservoir 86B.

A plurality of motor arms 126 are attached to the linear actuator motor 104, shown in FIG. 5, for pivoting the head/actuator assembly 96 about pivot axis 106A. Motor arms 126 provide a rotational torque to outer hub 110 for selectively positioning the magnetic heads 100 to the desired track on the magnetic storage media 94.

The bearing cartridge 10B of the present invention makes use of ferrofluidic seals for preventing material from escaping the bearing cartridge and contaminating the disk surface which may cause a head crash condition. In addition, the bearing cartridge of the present invention tends to dampen high frequency oscillations of the actuator arms that result from rapid acceleration of the actuator arms.

Figure 7:
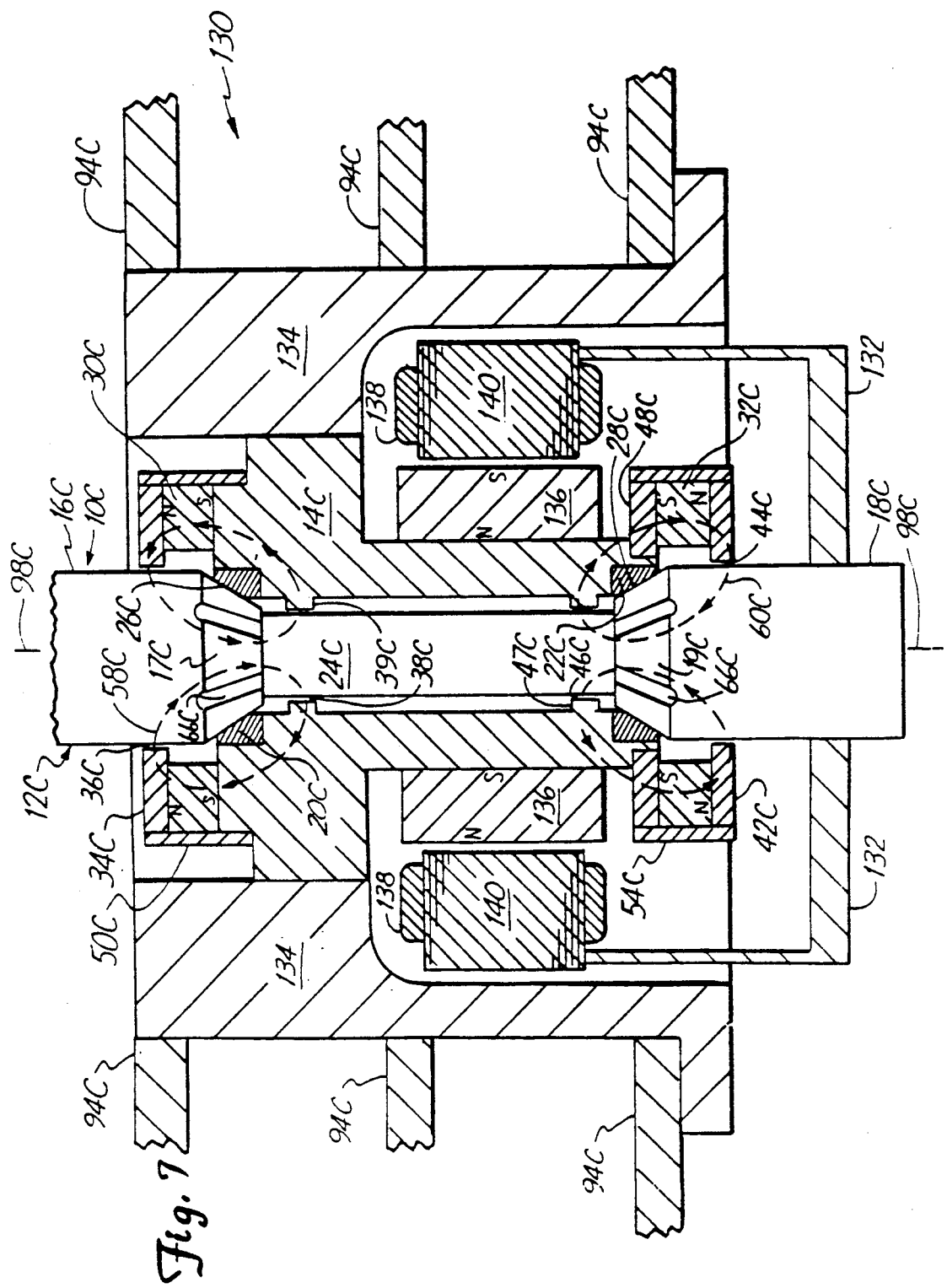
FIG. 7 is a side elevational view of a disk spindle motor that includes the bearing cartridge shown in FIGS. 1 and 2.

FIG. 7 illustrates a disk spindle motor 130 that incorporates bearing cartridge 10C of the present invention. Bearing cartridge 10C includes inner shaft portion 12C having an upper shaft section 16C and a lower shaft section 18C that are pressed on to a central shaft section 24C. The inner shaft portion 12C has a central axis 98C that defines the spindle axis 98 shown in FIG. 5. The inner shaft portion 12C is mounted to motor base 132.

An outer hub portion 14C is supported by inner shaft portion 12C. The outer hub portion 14C includes upper sleeve 20C and lower sleeve 22C. Both upper sleeve 20C and lower sleeve 22C have an inner surface that has a taper that is complementary to the tapered surfaces 17C and 19C, respectively, of inner shaft portion 12C.

An upper gap having a ferrofluid lubricant contained therein is defined by the tapered surface on the inside portion of upper sleeve 20C and tapered surface 17C. The ferrofluid lubricant in upper gap 20C is contained by a magnetic flux produced by upper permanent magnetic means 30C in a manner identical to bearing cartridge 10 shown in FIGS. 1 and 2. Magnetic flux provided by upper permanent magnet means 30C flows through upper a flux channeling means 34C that channels flux across a first upper gap 36C and through upper shaft section 18C, through central shaft section 24C, a and the back across a second upper gap 38C, through an inner flux channeling means 39C, through hub portion 14C and back to upper permanent magnet means 30C. The upper flux channeling means 34C, inner flux channeling means 39C, upper shaft section 16C, central shaft section 24C and hub portion 14C are a magnetically permeable material such as magnetic stainless steel so as to provide a good flux path. The magnetic flux paths for containing ferrofluid lubricant about the upper gap 26C is indicated by arrows 58C.

A lower gap 28C, having a ferrofluid lubricant therein, is defined by the tapered surface on the inner portion of lower sleeve 22C and tapered surface 19C. The ferrofluid lubricant in lower gap 28C is contained by magnetic flux lines produced by lower permanent magnet means 32C in a manner similar to bearing cartridge 10. Magnetic flux flows from lower permanent magnet means 32C through a lower flux channeling means 42C, across first lower gap 44C to lower shaft section 18C, through central shaft section 24C, and then back across second lower gap 46C, through an inner flux channeling means 47C, through hub portion 14C, through an inner pole piece 48C, and back to lower permanent magnet means 32C. The magnetic flux path for containing ferrofluid about the lower gap 28C is indicated by arrows 60C. The lower flux channeling means 42C, lower shaft section 18C, central shaft section 24C, hub portion 14C, and an inner pole piece 48C are a magnetically permeable material such as magnetic stainless steel, so that they provide a good flux path.

Motor hub 134 is attached to outer hub portion 14C. Motor hub 134 is preferably made from a light weight material such as aluminum and is press fit over outer hub portion 14C. Attached to motor hub 134 is the magnetic storage media 94C. The magnetic storage media 94C is preferably a plurality of magnetic storage disks that are spaced vertically from each other and fixedly attached to motor hub 134.

Mounted to outer hub portion 14C are motor magnets 136 used to cause rotation of the outer hub portion 14C. Motor magnets 136 are permanent magnets that produce lines of flux perpendicular to the axis of rotation 98C. These lines of flux produced by motor magnets 136 interact with magnetic fields produced by stator windings 138 to cause rotation of the outer hub portion 14C. Stator windings 138 are wound on the poles of stator cores 140 which are in turn supported on motor base 132. Motor base 132 is in turn mounted to chassis 92, shown in FIG. 5.

FIG. 8 illustrates another embodiment of disk spindle motor 150 that incorporates a bearing cartridge 10D of the present invention. Bearing cartridge 10D is similar to bearing cartridge 10A shown in FIGS. 3 and 4. Bearing cartridge 10D includes an upper shaft section 16D, a central shaft section 24D and a lower shaft section 18D. Both the upper shaft section 16D and the lower shaft section 18D are pressed onto central shaft 24D. The inner shaft portion 12D is supported by a motor base 132D.

An outer hub portion 14D is supported by inner shaft portion 12D. The outer hub portion 14D includes an upper sleeve 20D and a lower sleeve 22D that are press fit, glued or adhesively bonded to outer portion 14D. The upper sleeve 20D has an internal taper that is complementary to the taper of an outer surface 17D of upper shaft section 16D. Similarly, lower sleeve 22D has an inner surface that has a complementary taper to an outer surface 19D of lower shaft section 18D. An upper gap 26D is defined by the tapered outer surface 17D of upper shaft section 16D and the inner tapered surface of upper sleeve 20D. Similarly, a lower gap 28D is defined by the tapered outer surface 19D of lower shaft section 18D and the tapered inner surface of lower sleeve 22D. A ferrofluid lubricant is positioned in both upper gap 26D and lower gap 28D.

The ferrofluid lubricant is maintained in the upper gap 26D and the lower gap 28D by a magnetic flux that is produced by both the outer hub portion 14D and the inner shaft portion 12D. The outer hub portion 14D as well as the inner shaft portion 12D are made from a material that is capable of being magnetized, such as a high carbon steel, and then magnetized north and south. The magnetic north-south alignment of both the inner shaft portion 12D and the outer hub portion 14D is generally parallel to an axis of rotation 98D for the disk spindle motor 150. The north-south magnetic alignment of the outer hub portion 14D is opposite the magnetic alignment of the inner shaft portion 12D.

In one preferred embodiment, shown in FIG. 8, the outer hub portion 14D is magnetized so that the north magnetic pole is toward the lower portion of the hub, and the south magnetic pole is toward the upper portion of the hub. The inner shaft portion 12D is magnetized so that the magnetic north is toward the upper portion of the inner shaft and the magnetic south is toward the lower portion of the inner shaft. In this manner, the magnetic flux produced by the outer hub portion 14D adds with the magnetic flux produced by the inner shaft portion 12D. The use of two magnetized portions connected so that their magnetic flux adds allows the outer hub portion 14D and the inner shaft portion 12D to be made smaller while maintaining the same magnetic field strength as a system having just one magnetized portion.

The magnetic flux passes from the upper part of inner shaft portion 12D to the upper portion of outer hub portion 14D by an upper flux channeling means 34D. The magnetic flux passes through outer hub portion 14D to lower flux channeling means 42D and back into inner shaft portion 12D. The upper flux channeling means 34D is attached to the top central portion of outer hub portion 14D. The upper flux channeling means 34D is made from a magnetically permeable material thereby allowing flux to pass from inner shaft portion 12D across an air gap to the upper flux channeling means and the into outer hub portion 14D.

In addition to providing a flux path between inner shaft portion 12D and outer hub portion 14D, upper flux channeling means 34D also provides a mechanical seal for preventing ferrofluid lubricant from escaping disk spindle motor 150. Upper flux channeling means 34D provides a mechanical seal which requires less height than the ferrofluidic seals used on disk spindle motor 130 shown in FIG. 7, thereby allowing disk spindle motor 150 to be more compact.

The lower flux channeling means 42D is an inner flanged portion on the outer hub portion 14D. A first lower gap 44D is defined by an inner surface of lower flux channeling means 42D and an outer surface of lower shaft section 18D. The first lower gap is small relative to the separation of the inner shaft portion 12D and the outer hub portion 14D thus providing a path for magnetic flux to pass from outer hub portion 14D to inner shaft portion 12D. The flux concentration across the first lower gap 44D tends to hold ferrofluid lubricant therein thus forming a ferrofluidic seal for preventing ferrofluid lubricant from escaping disk spindle motor 150. A mechanical seal 152 is attached to the lower portion of outer hub portion 14D as an additional means to prevent ferrofluid lubricant from escaping the disk spindle motor 150. The mechanical seal 152 allows the disk spindle motor 150 to withstand greater gravity forces without allowing ferrofluid lubricant to escape therefrom.

The upper sleeve 20D and the lower sleeve 22D are preferably made from a non-magnetic material, such as bronze, for preventing magnetic flux from passing between the inner shaft portion 12D and either upper sleeve 20D or lower sleeve 22D. Thus, upper sleeve 20D and lower sleeve 22D prevent the magnetic flux path from "short circuiting" the magnetic flux.

Mounted to the outer portion of the inner wall of outer hub portion 14D are motor magnets 136D. These motor magnets 136D are permanent magnets that have a magnetic north/south orientation that is perpendicular to the axes of rotation 98D. The motor magnets 136D provide a magnetic flux that interacts with a magnetic field produced by stator windings 138D to cause rotation of outer hub portion 14D. The stator windings 138D are wound on stator cores 140D which are supported on motor base 132D.

Magnetic storage media 94D is attached to the outer portion of outer hub 14D. The magnetic storage media 94D is a plurality of magnetic storage disks that are spaced apart in a vertical stack thereby forming the disk stack.

The outer hub portion 14D is rotated relative to the inner shaft portion 12D by the magnetic flux interactions between the flux produced by permanent magnet 136D and the flux produced by stator windings 138D. Rotation of outer hub portion 14D in turn rotates the magnetic storage media 94D about the spindle axis 98D. As outer hub portion 14D rotates relative to inner shaft portion 12D, the ferrofluid lubricant in upper gap 26D is forced in an upward and outward direction along the inner tapered surface of upper sleeve 20D and the ferrofluid lubricant in lower gap 28D is forced outward and downward along the inner tapered surface of lower sleeve 22D. Ferrofluid lubricant is then forced back through return groove 66D on tapered surfaces 17D and 19D.

Figure 9:
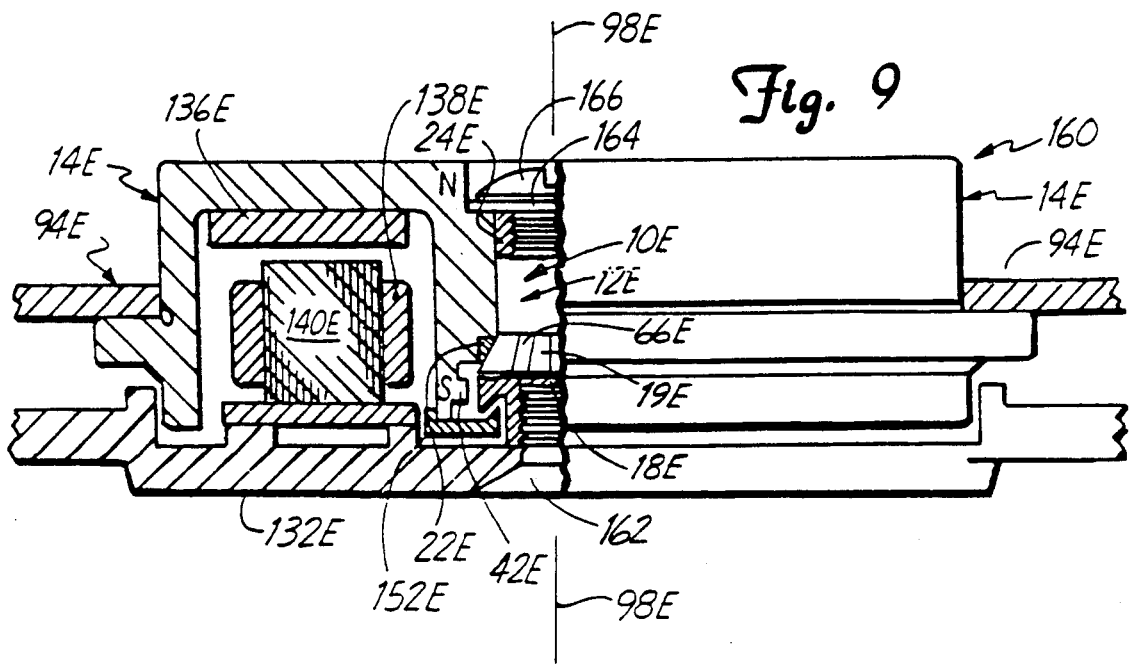
FIG. 9 is a side elevational view shown in partial section of another embodiment of the disk spindle motor shown in FIG. 7.

FIG. 9 illustrates another embodiment of the present invention, in which bearing cartridge 10E is integrated into disk spindle motor 160. The previously described disk spindle motors 130 shown in FIG. 7 and 150 shown in FIG. 8 both had an air gap that separated motor magnets from the stator winding that was oriented in a direction parallel to the axis of rotation. These types of disk spindle motors 130 and 150 are commonly referred to as axial air gap motors. The disk spindle motor 160 shown in FIG. 9 defines an air gap between motor magnets 136E and stator windings 138E that has an orientation perpendicular to the axis of rotation 98E for disk spindle motor 160. Disk spindle motor 160 is commonly referred to as a "radial air gap" motor.

Disk spindle motor 160 includes an outer hub portion 14E having magnetic storage media 94E attached thereto and is supported by bearing cartridge 10E which in turn is mounted to motor base 132E.

Bearing cartridge 10E includes an inner shaft portion 12E having a central shaft section 24E and a lower shaft section 18E. The inner shaft portion 12E is mounted to base 132E by a lower mounting screw 162 that extends through a bore in base 132E and into a threaded bore at the lower end of inner shaft portion 12E.

The lower shaft section 18E has a tapered surface 19E. A lower sleeve 22E is either press-fit, glued or adhesively bonded to outer hub portion 14E. The lower sleeve 22E has an inner surface that has a complimentary taper to the tapered surface 19E. A ferrofluid lubricant is positioned between the tapered inner surface of lower sleeve 22E and tapered surface 19E.

The ferrofluid lubricant is contained by magnetic flux produced by outer hub portion 14E. Outer hub portion 14E is made from a high carbon steel and magnetized such that the magnetic north/south orientation is parallel to the axis of rotation 98E. The magnetic flux from outer hub portion 14E passes through inner shaft portion 12E and across an air gap to lower flux channeling means 42E on outer hub portion 14E. The lower flux channeling means 42E forms a ferrofluidic seal for preventing ferrofluid lubricant from escaping. As an additional measure, mechanical seal 152E is attached to outer hub portion 14E for preventing ferrofluid lubricant from escaping the spindle motor 160.

Ferrofluid lubricant near the inner surface of lower sleeve 22E is forced downward and outward by the rotation of outer hub portion 14E. Ferrofluid lubricant returns through groove 66E on tapered surface 19E.

A mechanical seal 164 is secured by an upper sealing screw 166 that extends into a threaded aperture on the upper portion of inner shaft portion 12B. The mechanical seal 164 also provides a means for preloading the ferrofluid bearing.

Magnetic flux is produced by motor magnets 136E, this flux interacting with magnetic flux produced by stator windings 138E for rotating the outer hub portion 14E relative to the motor base 132E. The stator windings 138E are wound on stator cores 140E which are in turn mounted to motor base 132E.

In operation, the outer hub portion or rotor of the disk spindle motor is rotated by the magnetic flux interaction with the magnetic flux produced by the stator windings which, in turn, are attached to the base portion of the disk spindle motor. As the outer hub portion rotates, the ferrofluid lubricant is circulated through the ferrofluid bearing by a centrifugal pumping action. A magnetic flux produced by magnetizing the hub portion provides a magnetic flux which forms ferrofluidic seals which contain the ferrofluid lubricant within the disk spindle motor. Mechanical seals may be provided for additional sealing for high shock applications.

As the disk spindle motor rotates, the disk storage media attached thereto also rotates. The runout of the disk storage device is a measure of the goodness or lack of eccentricity produced when the magnetic storage media is rotated. The runout can be adjusted by changing the gap between the tapered surfaces forming the ferrofluid bearing. By changing the biasing force or bearing preloading is a method for adjusting the spacing between the tapered surfaces which indirectly adjust the thickness or amount of ferrofluid between these surfaces. In this manner, the runout of the disk spindle motor can be adjusted.

The present invention is a ferrofluid bearing that is particularly well suited for use in disk storage applications. The ferrofluid bearing of the present invention is well suited to miniaturization and can be manufactured easily, thereby reducing manufacturing costs.

As indicated, FIGS. 10-16 of the drawing depict the preferred embodiment of the invention in the form of an improved disk spindle motor. This unique design has significant advantages over all prior art arrangements known to the inventor and facilitates having very small motors which are especially useful in miniature magnetic or other disk drive applications. For example, this invention facilitates a disk spindle motor where the thickness or axially length of the motor is only 0.150 inches.

Figure 10:
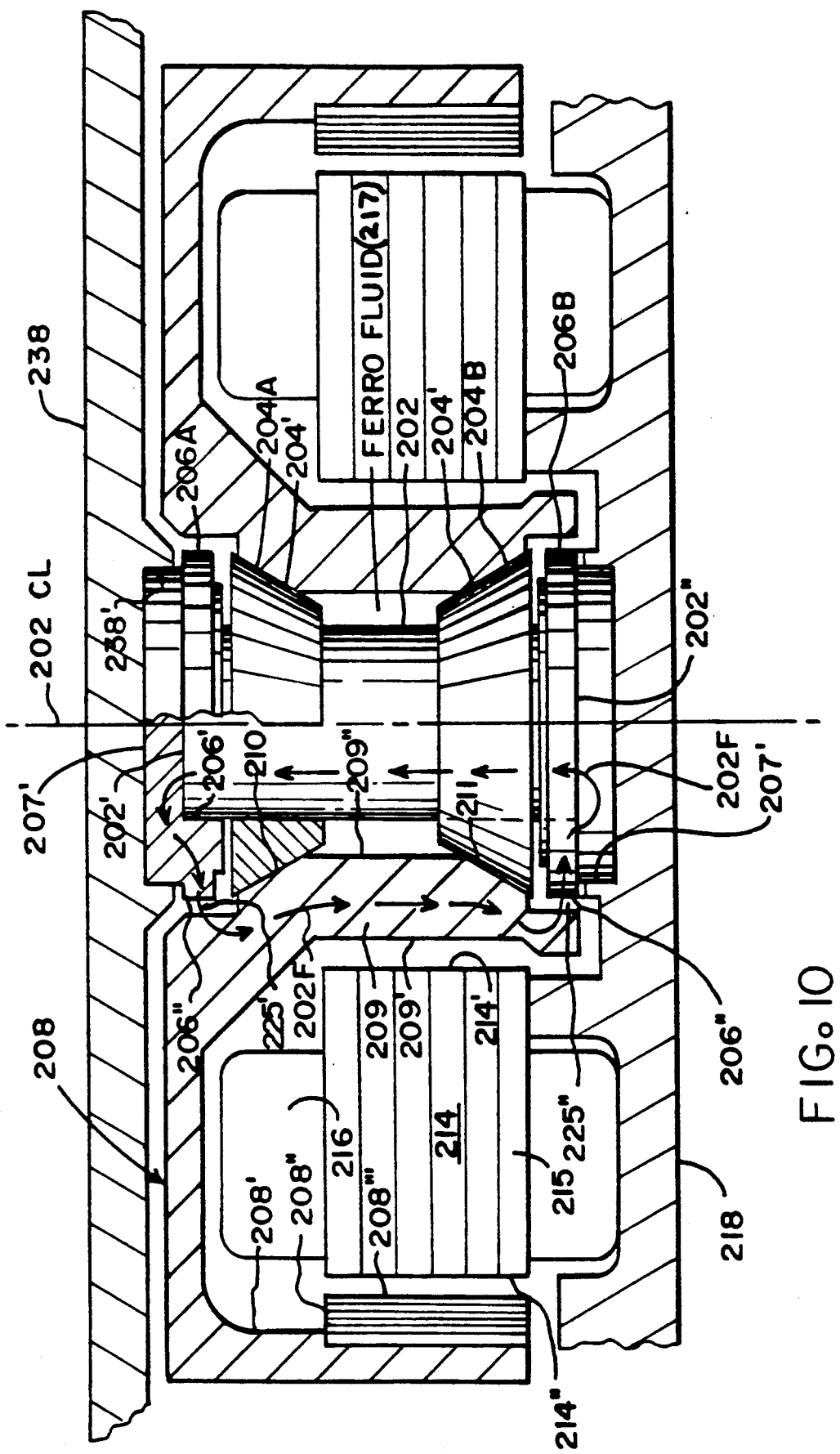
FIG. 10 is a side elevational sectional view of the preferred embodiment of the invention, i.e., an improved disk spindle motor, only the central portion of the motor being depicted.
Figure 12:
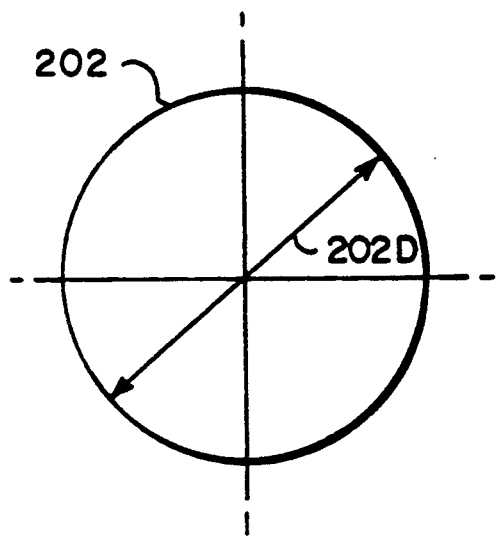
FIGS. 11 and 12 are side elevational and end views, respectively, of a permanent magnet cylindrical shaft used in the motor of FIG. 10.
Figure 11:
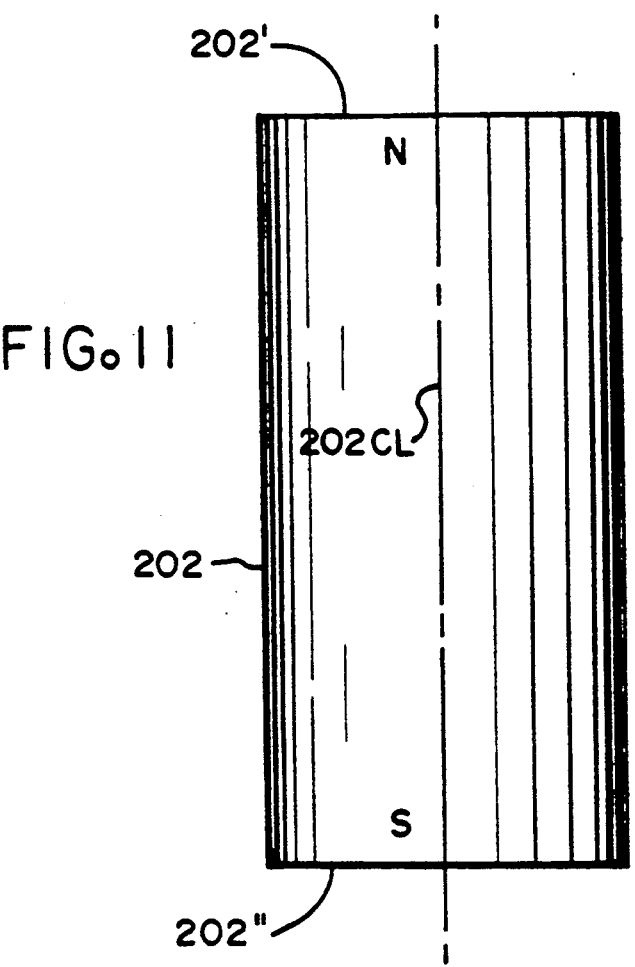

In FIG. 10 the improved disk spindle motor is designated by reference by numeral 200 and comprises a permanent magnet cylindrical shaft 202 having a preselected diameter 202D (see FIG. 12) and two ends 202' and 202" of opposite magnetic polarity and the center line 202CL of the shaft defining an axis. Thus in FIGS. 10 and 11 the shaft 202 is shown with end 202' being a north pole and 202" being a south pole.

The motor further includes a pair of annularly-shaped, non-magnetic combination thrust and journal magnetic fluid type bearing members 204A and 204B, which preferably are of identical construction depicted in FIGS. 13 and 14. Each bearing member is characterized by having an inner diameter 204D preselected with respect to shaft diameter 202D to facilitate the assembly of the bearings onto the shaft as depicted in FIG. 10. Those skilled in the art will recognize that said assembly of the bearing members 204A and 204B on the shaft may be a pressed fit. In other cases the bearings will be fixed to the shaft 202 through the use of a cement; one cement that may be used is the Locktite Company RC/609 adhesive.

The bearing members are further characterized by having the outer portion of said annular-shape tapered to define a truncated conical bearing surface 204'.

The motor further comprises a rotor 208 (see FIG. 10 for a partial showing) adapted to be assembled with the shaft 202 for rotation relative to the shaft about axis 202CL. Rotor 208 has a central annular hub 209 having an outer diameter 209' and also having a bore therethrough of a diameter 209" larger than the shaft diameter 202D. The hub 209 of rotor 208 is further characterized by having a pair of axially-spaced apart, oppositely-disposed, conically-shaped recesses 210 and 211. The hub 209 is made of magnetically permeable material at least adjacent to said rotor hub bore. Rotor 208 has an outer annular hub 208' containing, on the inner periphery thereof, means such as an annular of drum type permanent magnet 208" having a cylindrical inner periphery 208'" of a preselected diameter.

The motor further comprises a pair of cylindrical end caps 206A and 206B shown both in FIG. 10 as well as in FIGS. 15 and 16. The end caps have a central circular cap-shaped recess 206' in one end thereof of a diameter preselected to receive one end of the shaft 202. The circular periphery of the end cap is identified by reference numeral 207 terminating in an outboard flat surface 207'. A radially extending circular shoulder portion 206" projects radially out from 207 and has a circumferential surface of a preselected diameter. More specifically, the preselected diameter of shoulder portion 206" is selected to be slightly less than the cooperating portion of the rotor hub 208 as is better understood by reference to FIG. 10.

The end caps are made, at least in part, of magnetic permeable material so as to provide a continuous low reluctance path for the passage of magnetic flux from the central portion of the cap radially outward to and through the shoulder portion 206".

The motor further includes an annularly shaped motor stator and winding subassembly 214 comprising stator laminations 215 and appropriate winding 216. State 215 has a central axially extending bore 214' of a diameter larger than the diameter 209' of the rotor hub.

The motor further includes a lower base member 218 for supporting the subassembly 214. The base member has a central means for receiving one of the end caps. As shown in FIG. 10, this central means comprises a cup-shaped recess 219.

Referring again to FIG. 10, it will be noted that the motor further includes an upper base member 238 having a central cup-like means 238' adapted to receive the end cap 206A.

Referring again to FIG. 10, the rotor shaft bearing members and an appropriate ferrofluid 217 are assembled together with the bearing members being axially spaced apart on shaft 202 with the conical bearing surfaces 204 thereof being oppositely disposed as shown in FIG. 10 and with the surfaces 204' in close nesting proximity to the conically shaped recesses of the rotor hub. More specifically, as shown in FIG. 10, the bearing surface 204 of bearing 204A is in close nesting proximity to the conically shaped recess 210 of the rotor hub. Likewise, conical bearing surface 204' of bearing of 204B is in close nesting proximity to the conically shaped recess 211 of the rotor hub.

It will be noted in FIG. 10 that the axial length of shaft 202 is sufficient so that when the bearing members 204A and 204B are positioned, as aforesaid, with respect to the rotor hub 209 that the ends 202' and 202" of shaft 202 project outboard from the bearing members 204A and 204B respectively.

It will be noted in FIG. 10 that the axial length of shaft 202 is sufficient so that when the bearing members 204A and 204B are positioned, as aforesaid, with respect to the rotor hub 209 that the ends 202' and 202" of shaft 202 project outboard from the bearing members 204A and 204B respectively.

The end caps 206A and 206B are then placed on the ends of the shaft 202 as shown in FIG. 10, i.e., the shaft fitting into the recess 206'.

The axial length of the rotor hub is preselected so that when the rotor, shaft, bearings and end cap members are assembled as aforesaid, each of the circumferential surfaces 206" is spaced from, but closely adjacent to, the rotor bore to define a pair of annular gaps 255' and 225" therebetween.

The assembled rotor, shaft, bearing members and end caps are then mounted on the lower base member 218 so that the annular hub of the rotor is concentrically disposed in the bore 214' of the motor stator subassembly 214. End cap 206B is received by the central means 219 of the lower base member and is held in place by appropriate means such as an adhesive. One adhesive which is satisfactory is the 3M Company's AF42 adhesive. The inner periphery 208''' is concentrically spaced from the outer periphery 214" of the stator 215. When the windings 216 are energized from an appropriate source of electrical power (not shown), then, as is well understood by those skilled in the art, a rotating magnetic field is produced to interact with the permanent magnet 208''' to cause or produce rotational torque on rotor 208 to rotate about axis 202CL relative to the subassembly 214 on base 218.

In FIG. 10 the reference character 202F is used to designate a plurality of small arrows representative of magnetic flux flowing in a closed loop from end 202' of the permanent magnet 202 into end cap 206A through the cap to the radially extending shoulder 206" across the gap 225' and thence axially along the hub 209 to the portion of the rotor hub adjacent to the shoulder 206", crossing the gap 225" to end cap 206B and through same to return to the magnet at end 202" thereof.

The ferrofluid 217, abovementioned, is disposed in the bearing surfaces 204'/210 and 204'/211. The ferrofluid is retained between the end caps due to the high concentration of magnetic flux in the gaps 225' and 225".

There are number of advantages associated with the disk spindle motor depicted in FIG. 10. It will be noted that a single shaft which is a permanent magnet provides several functions. It serves as a primary central means for the motor and concurrently, being a permanent magnet, functions to provide the flux flow for providing the above described seals for retaining the ferrofluid. The conical bearings to provide a combination thrust and journal bearing function.

It has been found that it is desirable to have the axial length of the magnetic shaft 202 at least twice the diameter of the shaft.

One of the significant advantages of this invention is the relatively small number of parts as compared to prior art spindle motors; this, in turn, helps minimize manufacturing costs. Of great importance is the compact and efficient design permitted by the applicant's unique configuration. As indicated, motors have been constructed using the applicant's unique design where the axial length of the motor was only 0.150 inches.

The end caps provide a multi-function as described above. To summarize, the end caps provide the functions of being a flux collector from the permanent magnet shaft then providing a low reluctance path radially outward to and through the radially shoulders. Secondly, the end caps function to efficiently mount the rotor-bearing-shaft subassembly onto and between the lower and upper base members. Last, but not least, the end caps provide the above described ferrofluidic seals for the motor.

Figure 17:
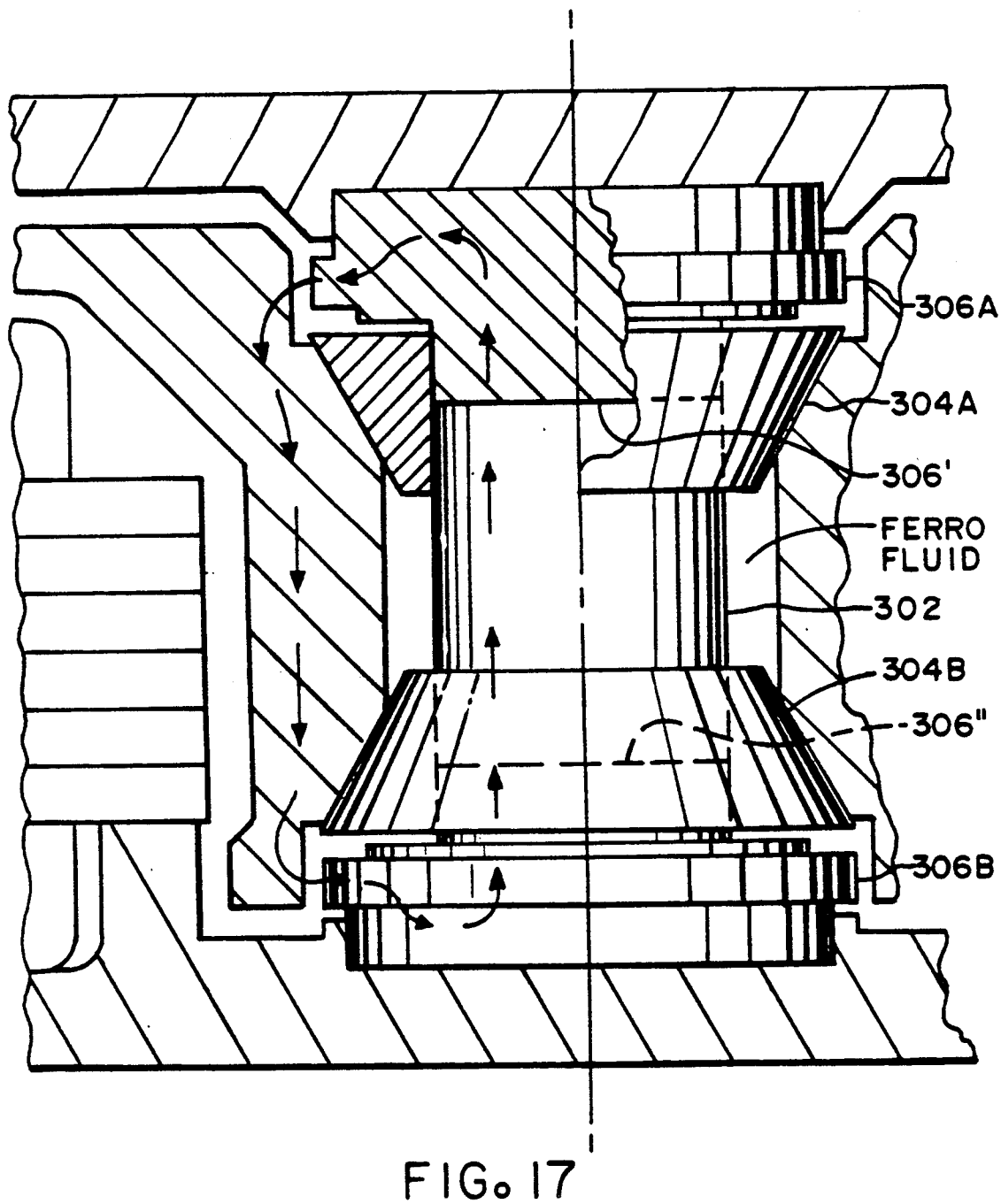
FIG. 17 is a side elevational sectional view of an alternate embodiment of the FIG. 10 motor.

FIG. 17 is a modified embodiment of the invention having many similar parts to the motor depicted in FIG. 10. However, a key difference is that the end caps of FIG. 10 have been replaced by end pieces 306A and 306B which, instead of a recess 206' and 206" respectively, have axially inwardly extending circular pole pieces 306AA and 306BB of substantially the same diameter as the diameter of the permanent magnet 302. The pole pieces are identified by reference numerals 306' and 306". The axial length of the permanent magnet 302 and the axial lengths of the end members 306A and 306B are collectively preselected so that after the rotor subassembly is accomplished the axial ends of pole pieces 306' and 306" respectively abut against the axial ends of the magnet 302 at a point within the bearings 304A and 304B. The arrangement of FIG. 17 may be especially advantageous for larger motors having larger axial dimensions.

Although the present invention has been described with reference to preferred embodiments, workers skilled in the art will recognize that changes may be made in form and detail without departing from the spirit and scope of the invention.

What is claimed is:

1. A disk spindle motor comprising:
   a) a permanent magnet cylindrical shaft having a preselected diameter, two ends of opposite magnetic polarity, and the center line of said shaft defining an axis;
   b) a pair of annularly shaped non-magnetic combination thrust and journal magnetic fluid-type bearing members, said members each being characterized by having:
      (i) an inner diameter preselected with respect to said shaft diameter to facilitate the assembly of said bearings onto said shaft, and
      (ii) the outer portion of said annular shape tapered to define a truncated-conical bearing surface;
   c) a motor rotor adapted to be assembled with said shaft for rotation relative to said shaft about said axis, said rotor having a central annular hub having an outer diameter and also having a bore therethrough of a diameter larger than said shaft diameter, said hub further being characterized by having a pair of axially spaced apart, oppositely disposed conically shaped recess and said hub being of magnetically permeable material at least adjacent to said rotor hub bore;
   d) a pair of cylindrical end caps, each:
      (i) having a central circular cup-shaped recess in one end thereof of a diameter preselected to receive one end of said shaft;
      (ii) having a radially extending circular shoulder portion having a circumferential surface and a preselected diameter, and
      (iii) being made, at least in part, of magnetic permeable material to include, as a continuous low reluctance path, said shoulder portion and the portion of said cap adjacent said cup-shaped recess;
   e) an annularly shaped motor stator and stator winding subassembly having a central axially-extending bore of a diameter larger than said hub outer diameter;
   f) a lower base member for supporting said annularly shaped motor stator and stator winding subassembly, said base member also comprising a central means for receiving one of said end caps;
   said rotor, said shaft, and said bearing members being assembled together with said pair of bearing members being spaced axially apart on said shaft so that each of said conical bearing surfaces of said bearing members is disposed, respectively, adjacent and in close nesting proximity to one of said pair of conically shaped recesses of said rotor hub and so that said each end of said shaft projects axially outboard from said bearing members, each of said ends of said shaft thereafter being respectively inserted into said circular cup-shaped recess of one of said end caps,
   the axial length of said rotor hub being preselected so that when said rotor, shaft, bearings and end cap members are assembled as aforesaid, each of said circumferential surfaces on said shoulders of said end caps is spaced from but closely adjacent to said rotor hub bore to define a pair of annular gaps therebetween, and
   the assembled rotor, shaft, bearing members, and end caps thence being mounted on said lower base member so that said:
      (i) annular hub of said rotor is concentrically disposed in said bore of said motor stator subassembly; and
   (g) a ferrofluid disposed between said conical bearing surfaces of said bearing members and said recesses of said rotor hub.

2. Apparatus of claim 1 further characterized by magnetic flux produced by said permanent magnet shaft flowing in a closed low reluctance path from a first of said ends of said shaft to its respective one of said end caps and from said circumferential surface thereof to and along said rotor hub, thence to said circumferential surface of the other of said end caps, thence through said other of said end caps and thence to the other of said ends of said shaft.

3. Apparatus of claim 2 further characterized by said magnetic flux flow between said rotor hub and said circumferential surfaces functioning as ferrofluidic seals to retain ferrofluid fluid between said end caps and within said rotor hub.

4. Apparatus of claim 1 further characterized by having an upper base member for receiving the other of said end cap members.

5. A disk spindle motor comprising:
   a) a permanent magnet cylindrical shaft having a preselected diameter, two ends of opposite magnetic polarity, and the center line of said shaft defining an axis;
   b) a pair of annularly shaped non-magnetic combination thrust and journal magnetic fluid-type bearing members, said members each being characterized by having:
      (i) an inner diameter preselected with respect to said shaft diameter to facilitate the assembly of said bearings onto said shaft, and
      (ii) the outer portion of said annular shape tapered to define a truncated-conical bearing surface;
   c) a motor rotor adapted to be assembled with said shaft for rotation relative to said shaft about said axis, said rotor having a central annular hub having an outer diameter and also having a bore therethrough of a diameter larger than said shaft diameter, said hub further being characterized by having a pair of axially spaced apart, oppositely disposed conically shaped recess and said hub being of magnetically permeable material at least adjacent to said rotor hub bore;
   d) a pair of cylindrical end caps, each:
      (i) having a central means in one end thereof and adapted receive one end of said shaft;
      (iii) being made, at least in part, of magnetic permeable material to include, as a continuous low reluctance path, said shoulder portion and the portion of said cap adjacent said central means;

e) an annularly shaped motor stator and stator winding subassembly having a central axially-extending bore of a diameter larger than said hub outer diameter;

f) a lower base member for supporting said annularly shaped motor stator and stator winding subassembly, said base member also comprising a central means for receiving one of said end caps;

said rotor, said shaft, and said bearing members being assembled together with said pair of bearing members being spaced axially apart on said shaft so that each of said conical bearing surfaces of said bearing members is disposed, respectively, adjacent and in close nesting proximity to one of said pair of conically shaped recesses of said rotor hub, each of said ends of said shaft thereafter being respectively abutted against said central means of one of said end caps, the axial length of said rotor hub being preselected so that when said rotor, shaft, bearings and end cap members are assembled as aforesaid, each of said circumferential surfaces on said shoulders of said end caps is spaced from but closely adjacent to said rotor hub bore to define a pair of annular gaps therebetween, and the assembled rotor, shaft, bearing members, and end caps thence being mounted on said lower base member so that said:

(i) annular hub of said rotor is concentrically disposed in said bore of said motor stator subassembly; and (ii) one of said end caps is received by central means of said base member; and (g) a ferrofluid disposed between said conical bearing surfaces of said bearing members and said recesses of said rotor hub.

6. Apparatus of claim 5 further characterized by magnetic flux produced by said permanent magnet shaft in a closed low reluctance path from a first of said ends of said shaft to its respective one of said end caps and from said circumferential surface thereof to and along said rotor hub, thence to said circumferential surface of the other of said end caps, thence through said other of said end caps and thence to the other of said ends of said shaft.

7. Apparatus of claim 1 further characterized by said magnetic flux flow between said rotor hub and said circumferential surfaces functioning as ferrofluidic seals to retain ferrofluid fluid between said end caps and within said rotor hub.

8. Apparatus of claim 5 further characterized by having an upper base member for receiving the other of said end cap members.

9. Apparatus of claim 5 further characterized by said end cap central means being a circular cup-shaped recess of a diameter preselected to receive one end of said shaft.

10. Apparatus of claim 5 further characterized by said end cap central means being an axially extending cylindrical member concentric with said circular shoulder portion and having a diameter preselected to facilitate the insertion thereof into said bearing.

* * * * *